United States Patent
Sun

(10) Patent No.: US 8,570,732 B2
(45) Date of Patent: Oct. 29, 2013

(54) HARD DISK DEVICE

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 183 days.

(21) Appl. No.: 13/220,723

(22) Filed: Aug. 30, 2011

(65) Prior Publication Data

US 2012/0307446 A1    Dec. 6, 2012

(30) Foreign Application Priority Data

Jun. 3, 2011  (CN) .......................... 2011 1 0149050

(51) Int. Cl.
*G06F 1/16* (2006.01)
(52) U.S. Cl.
USPC ................. 361/679.33; 312/334.44; 439/638; 248/278.1
(58) Field of Classification Search
USPC ............. 361/679.31, 679.32, 679.33, 679.35, 361/679.36, 679.4; 312/223.1, 223.2, 312/223.3, 334.44; 439/680, 677, 638; 248/305, 611, 286.1, 157, 688, 278.1
See application file for complete search history.

(56) References Cited

U.S. PATENT DOCUMENTS

| | | | | |
|---|---|---|---|---|
| 8,264,832 B2* | 9/2012 | Sun et al. | ................. | 361/679.33 |
| 2009/0219680 A1* | 9/2009 | Kouyama et al. | ........ | 361/679.31 |
| 2009/0316350 A1* | 12/2009 | Hu | ............ | 361/679.33 |
| 2011/0188194 A1* | 8/2011 | Sun | ........... | 361/679.33 |

* cited by examiner

*Primary Examiner* — Hung Duong
(74) *Attorney, Agent, or Firm* — Altis & Wispro Law Group, Inc.

(57) ABSTRACT

A hard disk device comprises a main portion and two pads connected to the main portion. The main portion includes a front end, a rear end opposite to the front end, a top surface, a bottom surface opposite to the top surface, a first side surface and a second side surface opposite to the first side surface. The first side surface defines a connecting hole located nearby the front end, and the second side surface defines a connecting hole located nearby the front end. Each pad includes a shank portion and a head portion connected to an end of the shank portion. The head portion includes a connecting portion connected to the shank portion and an external portion surrounding the connecting portion. The shank portion is fixedly inserted into a corresponding connecting hole. Portion of the external portion protrudes from the bottom surface of the main portion.

7 Claims, 4 Drawing Sheets

HARD DISK DEVICE

CROSS-REFERENCE TO RELATED APPLICATION

This application is related to a commonly-assigned co-pending application entitled "HARD DISK DEVICE" Ser. No. 13/221,845. The disclosure of the above-identified application is incorporated herein by reference.

BACKGROUND

1. Technical Field

The present disclosure relates to storage devices, and particularly, relates to a hard disk device.

2. Description of Related Art

A hard disk device is a typical storage device for storing information therein. The hard disk device can be a built-in hard disk device or a portable hard disk device.

The hard disk device typically includes a main portion, a circuit board and other electronic elements mounted on the main portion, and a protective housing packaging the main portion therein for protecting the circuit board and other electronic elements. In assembly or during testing, the protective housing of the hard disk device may be removed from the main portion to expose the circuit board and other electronic elements. The hard disk device without the protective housing may be exposed to pollutants, such as dust and/or water, on the table causing a short circuit to the hard disk device. In addition, the circuit board and other electronic elements may be damaged because of the direct contact to the table.

What is needed therefore is a hard disk device addressing the limitations described.

BRIEF DESCRIPTION OF THE DRAWINGS

The components of the drawings are not necessarily drawn to scale, the emphasis instead being placed upon clearly illustrating the principles of the embodiments of the hard disk device. Moreover, in the drawings, like reference numerals designate corresponding parts throughout several views.

DETAILED DESCRIPTION

Figure 1:
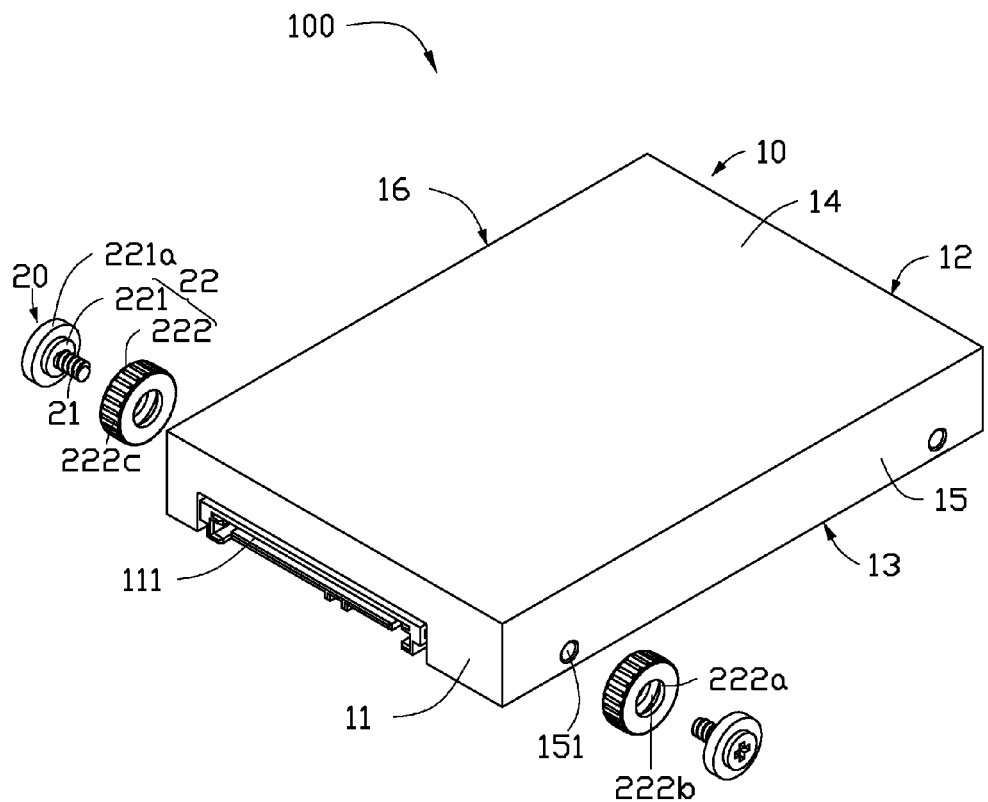
FIG. 1 is an exploded view of a hard disk device, according to an exemplary embodiment of the present disclosure.
Figure 2:
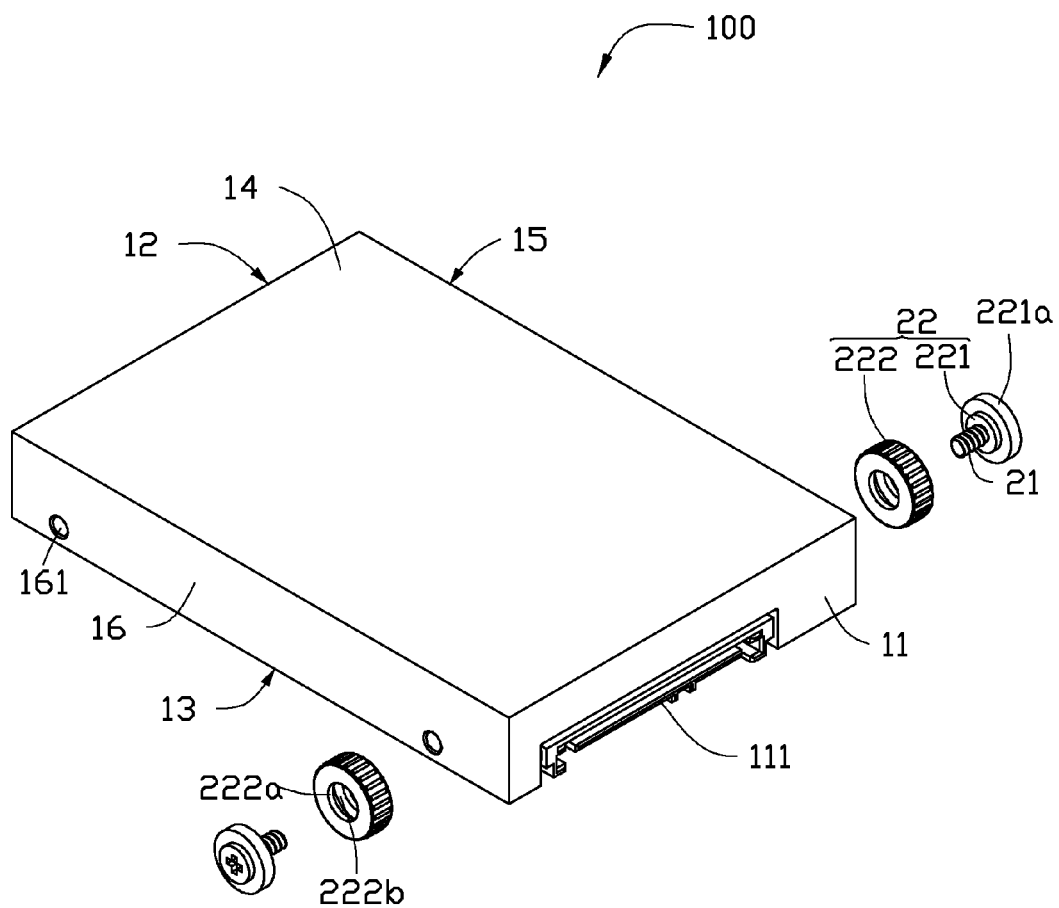
FIG. 2 is similar to FIG. 1, but showing the hard disk from another angle.

Referring to FIGS. 1-2, a hard disk device 100, according to an exemplary embodiment, is shown. The hard disk device 100 includes a main portion 10 and a number of pads 20 connected to the main portion 10.

The main portion 10 is substantially cuboid-shaped. The main portion 10 includes a front end 11 and a rear end 12 opposite to the front end 11, a bottom surface 13, a top surface 14 opposite to bottom surface 13, a first side surface 15 and a second side surface 16 opposite to the first side surface 15. The bottom surface 13, the top surface 14, the first side surface 15 and the second side surface 16 are between the front end 11 and the rear end 12. The front end 11 defines an inserting opening 111, for connecting the hard disk 100 to other devices (not shown). The bottom surface 13 is substantially parallel to the top surface 14, and the first side surface 15 is substantially parallel to the second side surface 16. The first side surface 15 defines two connecting holes 151, one connecting hole 151 is located nearby the front end 11, and the other connecting hole 161 is located nearby the rear end 12. The second side surface 16 defines two connecting holes 161, one connecting hole 161 is located nearby the front end 11, and the other connecting hole 161 is nearby the rear end 12. In this embodiment, the connecting holes 151, 161 are threaded holes. The main portion 10 includes a circuit board and other electronic elements (not shown) mounted thereon. At least one portion of the circuit board and other electronic elements are mounted on the bottom surface 13.

Each pad 20 includes a shank portion 21 and a head portion 22 connected to an end of the shank portion 21. In this embodiment, the shank portion 21 is threaded. The head portion 22 includes a connecting portion 221 connected to the shank portion 21 and an external portion 222 surrounding the connecting portion 221. The connecting portion 221 is substantially circular-shaped. The connecting portion 221 includes a ring-shaped engagement protrusion 221a protruding from an outer edge thereof. The external portion 222 is substantially ring-shaped. An outer radius of the external portion 222 is larger than the perpendicular distance between a central axis of each connecting hole 151 (161) and the bottom surface 13. The external portion 222 defines a central opening 222a, the diameter of the central opening 222a is less than that of the engagement protrusion 221a. An inner side surface of the external portion 222 surrounding the central opening 222a defines a ring-shaped engagement groove 222b therein. The external portion 222 includes a number of rib portions 222c protruding from an outer surface thereof. In this embodiment, the rib portions 222c are uniformly distributed on the outer surface of the external portion 222. The external portion 222 is made from elastic materials, such as rubber or leather. In this embodiment, the number of the pads 20 is two.

Figure 3:
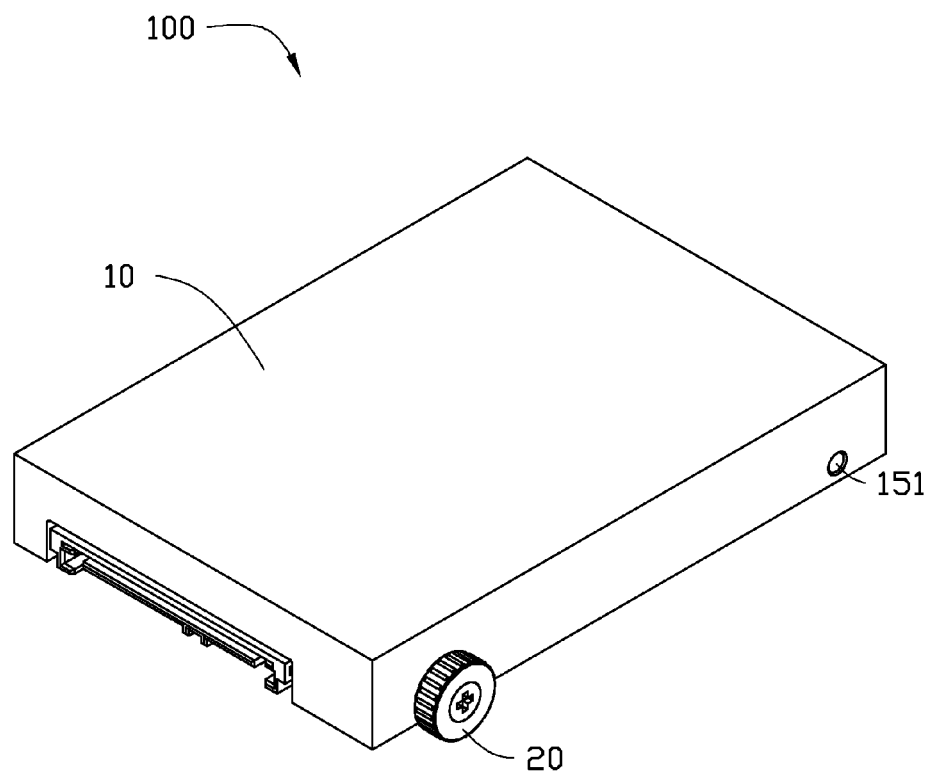
FIG. 3 is an assembled view of the hard disk device of FIG. 1.

Referring also to FIG. 3, in assembly, the external portion 222 is sleeved on the connecting portion 221, and the engagement protrusion 221a of the connecting portion 221 is engaged into the engagement groove 222a of the external portion 222. The shank portion 21 of each pad 20 inserts into a connecting hole 151 (or 161) nearby the front end 11 of the main portion 10. Because the radius of the external portion 222 is larger than the perpendicular distance between a central axis of each connecting hole 151 (161) and the bottom surface 13, portion of the external portion 222 is protruded from the bottom surface 11 of the main portion 10.

Figure 4:
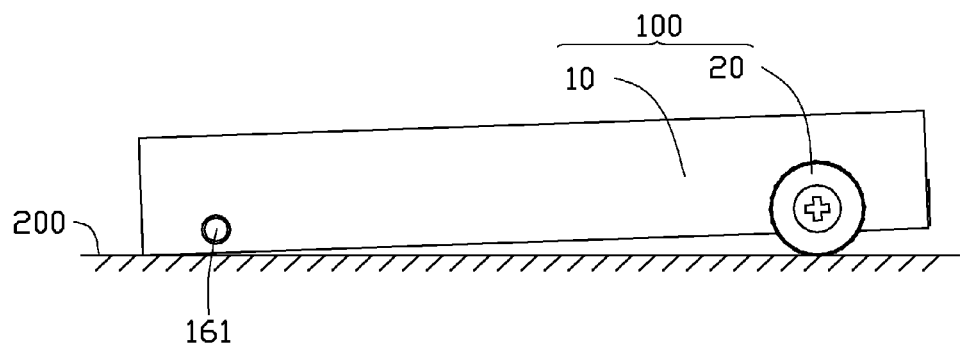
FIG. 4 is a schematic view of the hard disk device of FIG. 1 placed on a table.

Referring to FIG. 4, in assembly or testing, the hard disk device 100 can be put on a table 200, the bottom surface 13 of the main portion 10 faces the table 200, the front end 11 of the main portion 10 is spaced away from the table 200 by the pads 20, and the circuit board and other electronic elements on the main portion 10 can also be spaced away from the table 200. Thus, the circuit board and other electronic elements can avoid directly contacting the table, and the pollution of the circuit board and other electronic elements caused by pollutants on the table can also be avoided. Furthermore, because the front end 11 with the inserting opening 111 is spaced away from the table 200 by the pads 20, so the hard disk device 100 can conveniently to connect the hard disk device 100 to other devices. In addition, the damage of the circuit board and other electronic elements caused by the table 200 can also be avoided. The elastic external portion 222 can absorb the shock of the table 200, and the rib portions 222c can increase the friction between the pads 20 and the table 200, thus preventing the main portion 10 from slipping from the table 200.

The hard disk device 100 can be received in a protective housing (not shown) after assembly or testing.

In other embodiments, the number of the pads 20 can also be four, thus each connecting hole 151 (161) can be connected to a corresponding pad 20. Also, the pads 20 can be connected to the connecting holes 151, 161 by an interference fit manner.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A hard disk device, comprising:
    a main portion, comprising:
        a front end,
        a rear end opposite to the front end,
        a top surface,
        a bottom surface opposite to the top surface,
        a first side surface defining a first connecting hole located nearby the front end, and
        a second side surface opposite to the first side surface and defining a second connecting hole located nearby the front end; and
    two pads, each of the pads comprising a shank portion and a head portion, the head portion comprising a connecting portion connected to the shank portion and an external portion surrounding the connecting portion, the shank portion being fixedly inserted into a corresponding one of the first and second connecting holes, and portion of the external portion protruding from the bottom surface of the main portion in a direction away from the top surface.

2. The hard disk device of claim 1, wherein the main portion defines an inserting opening in the front end thereof.

3. The hard disk device of claim 1, wherein the first and second connecting holes are threaded holes, and the shank portions of the pads are threaded, each shank is screwed into a corresponding one of the first and second connecting holes.

4. The hard disk device of claim 1, wherein the external portion comprises a number of rib portions protruding from an outer surface thereof.

5. The hard disk device of claim 4, wherein the rib portions are uniformly distributed on the outer surface of the external portion.

6. The hard disk device of claim 1, wherein the external portion is made from rubber or leather.

7. A hard disk device, comprising:
    a main portion, comprising:
        a front end,
        a rear end opposite to the front end,
        a top surface,
        a bottom surface opposite to the top surface,
        a first side surface defining a first connecting hole located nearby the front end, and
        a second side surface opposite to the first side surface and defining a second connecting hole located nearby the front end; and
    two pads, each of the pads comprising a shank portion and a head portion, the head portion comprising a connecting portion connected to the shank portion and an external portion surrounding the connecting portion, the shank portion being fixedly inserted into a corresponding one of the first and second connecting holes, and portion of the external portion protruding from the bottom surface of the main portion;
    wherein the connecting portion comprises an engagement protrusion protruding from an outer edge thereof, and the external portion defines a central opening and an engagement groove in an inner side surface surrounding the central opening, the engagement protrusion is engaged into the engagement groove.

\* \* \* \* \*